US009261974B2

(12) United States Patent
Park et al.

(10) Patent No.: US 9,261,974 B2
(45) Date of Patent: Feb. 16, 2016

(54) APPARATUS AND METHOD FOR PROCESSING SENSORY EFFECT OF IMAGE DATA

(75) Inventors: Jung-Hoon Park, Seoul (KR); Kwang-Cheol Choi, Gwacheon-si (KR); Je-Han Yoon, Seongnam-si (KR)

(73) Assignee: SAMSUNG ELECTRONICS CO., LTD., Suwon-Si (KR)

( * ) Notice: Subject to any disclaimer, the term of this patent is extended or adjusted under 35 U.S.C. 154(b) by 173 days.

(21) Appl. No.: 13/368,820

(22) Filed: Feb. 8, 2012

(65) Prior Publication Data
US 2012/0201417 A1 Aug. 9, 2012

(30) Foreign Application Priority Data
Feb. 8, 2011 (KR) .................. 10-2011-0011053

(51) Int. Cl.
G06K 9/00 (2006.01)
G06F 3/03 (2006.01)
G06F 3/01 (2006.01)

(52) U.S. Cl.
CPC .............. *G06F 3/0304* (2013.01); *G06F 3/017* (2013.01)

(58) Field of Classification Search
None
See application file for complete search history.

(56) References Cited

U.S. PATENT DOCUMENTS

| 5,097,252 | A * | 3/1992 | Harvill et al. ................. 340/540 |
| 5,184,319 | A * | 2/1993 | Kramer ............................ 703/5 |
| 7,225,404 | B1 * | 5/2007 | Zilles et al. ................... 715/701 |
| 8,405,612 | B2 * | 3/2013 | Kruse ..................... G06F 3/014 |
| | | | 345/163 |
| 8,442,267 | B2 * | 5/2013 | Shin et al. ...................... 382/103 |
| 2002/0028003 | A1 * | 3/2002 | Krebs et al. ................... 382/115 |
| 2002/0136448 | A1 * | 9/2002 | Bortolussi et al. ............ 382/164 |
| 2002/0176610 | A1 * | 11/2002 | Okazaki et al. ............... 382/118 |
| 2009/0033746 | A1 * | 2/2009 | Brown et al. .................. 348/155 |
| 2009/0102805 | A1 * | 4/2009 | Meijer et al. .................. 345/173 |
| 2010/0177929 | A1 * | 7/2010 | Kurtz et al. ................... 382/103 |
| 2011/0091069 | A1 * | 4/2011 | Anabuki et al. ............... 382/103 |
| 2011/0188832 | A1 * | 8/2011 | Choi et al. .................... 386/239 |

FOREIGN PATENT DOCUMENTS

KR 10-2010-0033954 3/2010

OTHER PUBLICATIONS

Takayuki Hoshi, Masafumi Takahashi, Takayuki Iwamoto, and Hiroyuki Shinoda, "Noncontact Tactile Display Based on Radiation Pressure of Airborne Ultrasound", IEEE Transactions on Haptics, vol. 3, No. 3, Jul.-Sep. 2010, hereafter referred to as Hoshi.*
Greg Bryant, Russell Eberhart, Erik Frederick, John Gawel and Stephen Turner, "Glove Talk for $100", 1993 VR Conference Proceedings, 1993, hereafter referred to as Bryant.*
Hoshi et al (Noncontact Tactile Display Based on Radiation Pressure of Airbone Ultrasound, IEEE vol. 3 No. 3, Jul. 2010, p. 11).*

* cited by examiner

*Primary Examiner* — Bhavesh Mehta
*Assistant Examiner* — Oneal R Mistry

(57) ABSTRACT

A method and apparatus is capable of processing a sensory effect of image data. The apparatus includes an image analyzer that analyzes depth information and texture information about at least one object included in an image. A motion analyzer analyzes a motion of a user. An image matching processor matches the motion of the user to the image. An image output unit outputs the image to which the motion of the user is matched, and a sensory effect output unit outputs a texture of an object touched by the body of the user to the body of the user.

10 Claims, 3 Drawing Sheets

APPARATUS AND METHOD FOR PROCESSING SENSORY EFFECT OF IMAGE DATA

CROSS-REFERENCE TO RELATED APPLICATION(S) AND CLAIM OF PRIORITY

The present application is related to and claims priority under 35 U.S.C. §119(a) to a Korean Patent Application filed in the Korean Intellectual Property Office on Feb. 8, 2011 and assigned Serial No. 10-2011-0011053, the contents of which are incorporated herein by reference.

TECHNICAL FIELD OF THE INVENTION

The present invention relates to an apparatus and method for processing image data, and more particularly, to an apparatus and method for representing a sensory effect of image data.

BACKGROUND OF THE INVENTION

In general, video media content includes audio data and video data (moving pictures, still images, and the like). The video media content is played to a user by displaying images on a display and emitting sound through a speaker.

To provide a user with more real video media content, video media content has recently been created to include 3-dimensional (3D) images that stereoscopically represent objects included in images and various devices for providing video media content with 3D images to a user have been studied. Further, such video media content is created in such a manner that various effects of images can be imparted to the user beyond simple 3D visualization of images.

However, various effects of images are provided through changes in wind, vibration, or water in a limited area through a fixed device at a limited position.

Because effects represented in an image are given to a user through a fixed device at a limited position, the conventional scheme has limitations in imparting various effects of images to the user. Rather, it just gives simple effects such as changes in wind, vibration or water. Moreover, since effects of images are provided through the fixed device at the limited position, once the user moves out of the coverage of the device, intended effects of video media content are not provided successfully to the user.

Consequently, the conventional scheme of providing effects of images through a fixed device at a limited position is not effective in providing various effects of images to a user with an enhanced sense of reality and cannot reflect a motion or gesture of the user.

SUMMARY OF THE INVENTION

To address the above-discussed deficiencies of the prior art, it is a primary object to provide at least the advantages described below. Accordingly, an aspect of embodiments of the present invention is to provide an apparatus and method for providing a sensory effect reflecting characteristics of an object included in an image as well as an image reflecting a user's motion.

Another aspect of embodiments of the present invention is to provide an apparatus and method for directly conveying the surface texture of an object included in an image to a user.

In accordance with an embodiment of the present invention, there is provided an apparatus that processes a sensory effect of image data, in which an image analyzer analyzes depth information and texture information about at least one object included in an image, a motion analyzer analyzes a motion of a user, an image matching processor matches the motion of the user to the image, an image output unit outputs the image to which the motion of the user is matched, and a sensory effect output unit outputs a texture of an object touched by the body of the user to the body of the user.

In accordance with another embodiment of the present invention, there is provided a method for processing a sensory effect of image data, in which depth information and texture information about at least one object included in an image are analyzed, a motion of a user is analyzed, the motion of the user is matched to the image, the image to which the motion of the user is matched is output, and a texture of an object touched by the body of the user is output to the body of the user.

Before undertaking the DETAILED DESCRIPTION OF THE INVENTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

Throughout the drawings, the same drawing reference numerals will be understood to refer to the same elements, features and structures.

DETAILED DESCRIPTION OF THE INVENTION

FIGS. 1 through 4, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged imaging device. Reference will be made to the preferred embodiment of the present invention with reference to the attached drawings. While the following description includes specific details, it is to be clearly understood to those skilled in the art that the specific details are provided to help comprehensive understanding of the present invention and modifications and variations can be made to them within the scope and spirit of the present invention.

Figure 1:
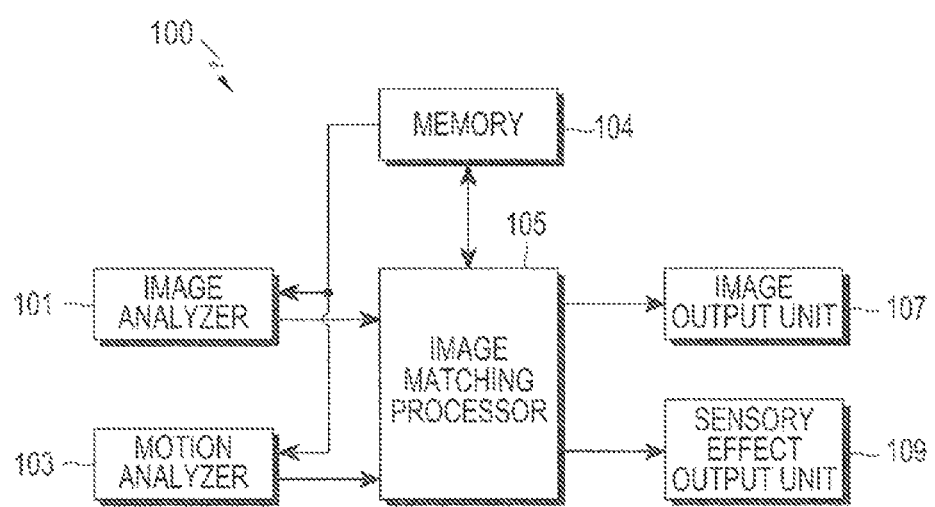
FIG. 1 illustrates an apparatus for processing a sensory effect of image data according to an embodiment of the present disclosure.

FIG. 1 illustrates an apparatus for processing a sensory effect of image data according to an embodiment of the present disclosure. Referring to FIG. 1, an apparatus 100 for processing a sensory effect of image data according to an embodiment of the present disclosure includes an image analyzer 101 for analyzing depth information and texture information about an object included in an image, a motion analyzer 103 for analyzing a motion of a user, a memory 104 for storing analyzed data received from the image analyzer 101 and the motion analyzer 103, an image matching processor 105 for matching the motion of the user to the image, an image output unit 107 for outputting the image to which the motion of the user is matched, and a sensory effect output unit 109 for outputting the texture of an object touched by the body of the user to the body of the user.

First, the image analyzer 101 reads image data from the memory 104 and identifies at least one object included in an image.

The image data can include depth information and texture information about the object included in the image and the image analyzer 101 can extract the depth information and texture information about the object from the image data. For example, the image data can be configured to include metadata of the depth information and texture information about the object. Then, the image analyzer 101 can extract the depth information and texture information about the object from the metadata.

In accordance with an embodiment of the present disclosure, depth information about an object included in an image indicates a distance inward into the image from the plane of a display device.

Alternatively, the image data can include only color information about an object included in an image without depth information and texture information about the object. In this case, the image analyzer 101 can identify the object included in the image by implementing a video processing algorithm on the image, calculate the depth of the object, and detect texture information about the object. For example, the image analyzer 101 can compare the object detected from the image with pre-modeled data of various objects (or items), selects an object corresponding to pre-modeled data matching the detected object, and determines texture information about the selected object as texture information about the detected object.

The motion analyzer 103 is a module that detects a motion of a user viewing an image output from the image output unit 107. The motion analyzer 103 can include an image input unit for detecting a real-time image of the user. For example, the image input unit can function as a general digital camera and thus can generate a digital image in an appropriate format by combining data received from an image sensor having a Charge-Coupled Device (CCD) element or Complementary Metal Oxide Semiconductor (CMOS) element for capturing a visible light incident from an external object, an intensity sensor for measuring light intensity, and a distance sensor for measuring a focal distance to an object.

Especially, the motion analyzer 103 further includes a motion extractor for detecting position information about the user and a body gesture of the user by applying a video processing algorithm to the image generated by the image input unit. More particularly, the motion extractor detects a body area of the user from the image, divides the body area into body parts each having a predetermined size, and detects the images of the body parts. Then the motion extractor detects distance information and motion information about each of the body parts. For example, the motion extractor divides the body of the user into the hands, the arms, the feet, the legs, the breast, the belly, the back, and the face and detects distance information and motion information about each of the body parts by calculating a relative distance of each body part from a position at which the user starts to make a motion, at every predetermined interval.

In an embodiment of the present disclosure, the distance information about a body part can indicate the distance between the user's body part and the motion analyzer 103 that detects the image of the user's body part or the distance between a predetermined position (such as, a position at which the user's body part starts to move) and the user's body part. The motion information about a body part represents the movement of the body part, as a motion vector of the body part.

The memory 104 can store data needed for an operation of the image analyzer 101 or the motion analyzer 103. In addition, the memory 104 can store data generated from the image analyzer 101 or the motion analyzer 103.

Figure 2:
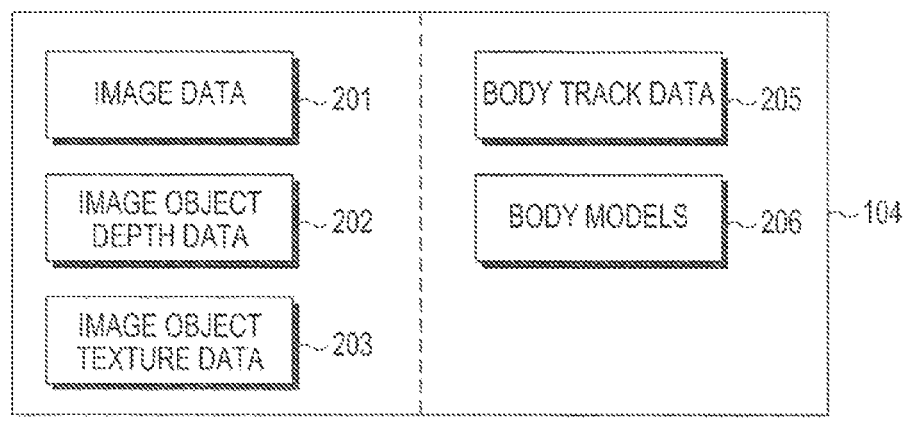
FIG. 2 illustrates exemplary data stored in a memory in the apparatus for processing a sensory effect of image data according to the embodiment of the present disclosure.

FIG. 2 illustrates exemplary data stored in the memory in the apparatus for processing a sensory effect of image data according to the embodiment of the present disclosure.

Referring to FIG. 2, the memory 104 can store image data 201 to be provided to the image analyzer 101. The memory 104 can also store image object depth data 202 and image object texture data 203 received from the image analyzer 101. The memory 104 stores body model data required for an operation of the motion analyzer 103, that is, body models 206 into which images of the bodies of a plurality of general users are modeled. In addition, the memory 104 stores body track data 205 including distance information and motion information about the body model of a user detected by the motion analyzer 103. The image data 201, the image object depth data 202, the image object texture data 203, and the body track data 205 can be provided to the image matching processor 105.

Meanwhile, the image matching processor 105 reads the image data 201 from the memory 204 and receives the images of the body parts and the distance information and motion information about each of the body parts from the motion analyzer 103, in real time. Then, the image matching processor 105 generates an output image by matching the image of a body part to an image included in the image data. When a body part touches an object included in the image, the image matching processor 105 reads texture information about the touched object from the memory 104 and outputs the distance information about the body part that has touched the object, along with the texture information about the object to the sensory effect output unit 109.

The image output unit 107 can be a display device, such as a Liquid Crystal Display (LCD), for displaying the output image. Especially, the output image can be a 3D image representing an object included in an image according to its depth information or position. The image output unit 107 can support output of the 3D image.

The sensory effect output unit 109 outputs the texture information about the object. For example, the sensory effect output unit 109 can emit an ultrasonic acoustic radiation pressure to various positions. The sensory effect output unit 109 is configured so as to emit different ultrasonic acoustic radiation pressures regarding different textures of objects. The sensory effect output unit 109 receives data indicating the texture type of the object from the image matching processor 105 and outputs an ultrasonic acoustic radiation pressure corresponding to the texture type. For example, if the object is a balloon, the sensory effect output unit 109 receives information about the texture type of the object (such as, the texture of an elastic rubber surface) and distance information about a user's body part touched by the object from the image matching processor 105, generates an ultrasonic acoustic radiation pressure that makes the user feel the texture of the object (such as, the texture of an elastic rubber surface), and outputs the ultrasonic acoustic radiation pressure to an area corresponding to the distance information about the user's body part.

Figure 3:
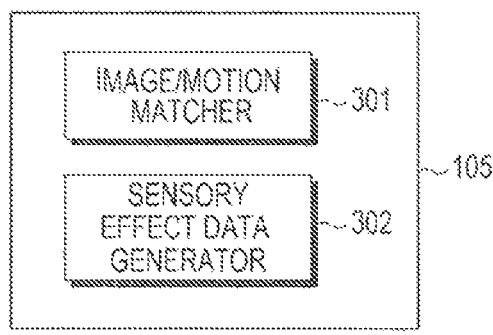
FIG. 3 illustrates an image matching processor in the apparatus for processing a sensory effect of image data according to the embodiment of the present disclosure.

FIG. 3 illustrates the image matching processor 105. Referring to FIG. 3, the image matching processor 105 includes an image/motion matcher 301 and a sensory effect data generator 302.

The image/motion matcher 301 combines the image of a user's body part captured in real time by the motion analyzer 103 with an image included in image data. For example, the image/motion matcher 301 combines the image with some parts of the user's hands and arms captured in real time by the motion analyzer 103, thereby producing an output image reflecting the movement state of the parts of the user's hands and arms.

The sensory effect data generator 302 reads the image object depth data 202 and the body track data 205 including distance information and motion information about the user's body part detected by the motion analyzer 103 from the memory 104. Then the sensory effect data generator 302 determines whether the body part of the user has touched an object included in the image, based on the image object depth data 202 and the body track data 205. If the user's body part has touched the object, the sensory effect data generator 302 extracts information about the texture type of the object from the image object texture data 203. Then, the sensory effect data generator 302 outputs the distance information about the user's body part and the texture type information about the object to the sensory effect output unit 109.

Now, a description will be given of an operation of the apparatus for processing a sensory effect of image data according to the embodiment of the present disclosure by describing a procedure for processing a sensory effect of image data according to an embodiment of the present disclosure.

Figure 4:
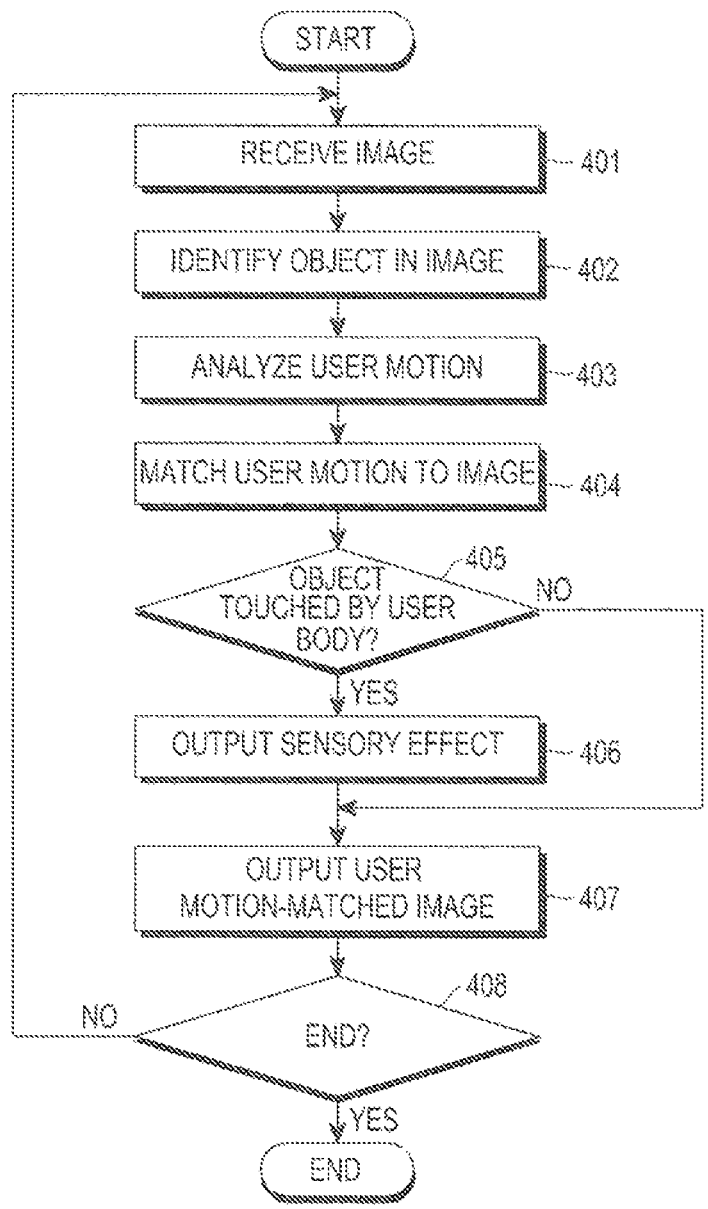
FIG. 4 illustrates a method for processing a sensory effect of image data according to an embodiment of the present disclosure.

FIG. 4 illustrates a method for processing a sensory effect of image data according to an embodiment of the present disclosure.

Referring to FIG. 4, the image analyzer 101 receives image data in block 401. The image data can be an externally received image or the image data 201 stored in the memory 104.

In block 402, the image analyzer 101 identifies at least one object included in an image from the image data.

The image data can include depth information and texture information about objects included in the image. Thus, the image analyzer 101 can extract depth information and texture information about the identified at least one object from the image data. For example, the image data can be configured so as to include metadata of the depth information and texture information about the object. Then, the image analyzer 101 can extract the depth information and texture information about the object by analyzing the metadata.

Alternatively, the image data can include only color information about an object included in an image without depth information and texture information about the object. In this case, the image analyzer 101 can identify the object included in the image by implementing a video processing algorithm on the image, calculate the depth of the object, and detect texture information about the object. For instance, the image analyzer 101 can compare the object detected from the image with pre-modeled data of various objects (or items), selects an object corresponding to pre-modeled data matching the detected object, and determines texture information about the selected object as texture information of the detected object. The depth information and texture information about the object determined in block 402 can be stored in the memory 104.

In block 403, a motion of a user is detected by the motion analyzer 103. The motion analyzer 103 detects color information about an object through the image sensor unit, measures a focal distance to the object, and generates a digital image in an appropriate format by combining the color information and the focal distance measurement. In addition, the motion analyzer 103 detects the body area of the user by applying a video processing algorithm to the generated image, divides the body area into body parts each having a predetermined size, and detects images of the body parts. Then, the motion analyzer 103 detects distance information and motion information about each of the body parts. The distance information and motion information about each body part determined in block 403 can be stored in the memory 104.

In block 404, the image matching processor 105 reads the image data 201 from the memory 104 and receives the images of the body parts and the distance information and motion information about the body parts from the motion analyzer 103 in real time. Then the image matching processor 105 generates an output image by matching the image of a body part to the image included in the image data.

In block 405, the image matching processor 105 determines whether a body part has touched the object included in the image, based on the distance information and motion information about each body part. If the body part has touched the object in block 405, the image matching processor 105 reads texture information about the touched object from the memory and outputs the texture information about the object along with position information about the touched body part to the sensory effect output unit 109. The sensory effect output unit 109 outputs an ultrasonic acoustic radiation pressure corresponding to the texture type of the object to an area corresponding to the position information about the body part in block 406.

In block 407, the output image generated in block 404 is provided to the image output unit 107 and the image output unit 107 outputs the output image to the display, etc.

Alternatively, if none of the body parts have touched the object included in the image in block 405, the procedure jumps to block 407 without performing block 406.

While blocks 406 and 407 have been described as separate steps in the method for processing a sensory effect of image data according to the embodiment the present disclosure, in some embodiments, they are performed substantially simultaneously.

As is apparent from the above description of the apparatus and method for processing a sensory effect of image data according to the present disclosure, a sensory effect reflecting the characteristics of an object included in an image as well as an image reflecting a motion of a user can be provided to the user.

In addition, the surface texture of the object included in the image can be provided directly to the user.

Although the present disclosure has been described with an exemplary embodiment, various changes and modifications may be suggested to one skilled in the art. It is intended that the present disclosure encompass such changes and modifications as fall within the scope of the appended claims.

What is claimed is:

1. An electronic device for processing image data, the apparatus comprising:
 a camera; and
 a processor configured to:
  determine depth information and texture information about one or more objects included in a first image;
  determine a motion of a body of a user included in a second image generated by the camera;
  determine whether there is a first object, from among the one or more objects, touched by the body of the user, based on the motion of the body of the user, wherein first image data is configured to include metadata of depth information and texture information about the first object, wherein a motion analyzer detects distance information and motion information about each of the body parts via a motion vector relative to a distance of the object;
  if there is the first object touched by the body of the user, determine a sensory effect corresponding to a texture of the first object based on the depth information and the texture information and output the sensory effect using ultrasonic acoustic radiation pressure; and
  else when none of the body parts touch the object, review another image data for the camera.

2. The electronic device of claim 1, wherein the processor is further configured to identify the one or more objects included in the first image, calculate the depth information for the one or more objects, and detect the texture information about the one or more objects.

3. The electronic device of claim 1, wherein the processor is further to:
 generate the second image of the body of the user in real time; and
 determine another distance between the electronic device and the body of the user, and a body motion of the user using the second image.

4. The electronic device of claim 3, further comprising a memory configured to store body models of a plurality of general users, wherein the processor is further configured to determine a second object corresponding to a body model included in the second image of the body of the user, and track movement of the second object.

5. The electronic device of claim 1, wherein the processor is configured to output a different sensory effect corresponding to different textures of the first object.

6. A method for processing of image data at an electronic device, the method comprising:
 determining depth information and texture information about one or more objects included in a first image;
 determining a motion of a body of a user included in a second image generated by the camera;
 determining whether there is a first object, from among the one or more objects, touched by the body of the user, based on the motion of the body of the user, wherein first image data is configured to include metadata of depth information and texture information about the first object, wherein a motion analyzer detects distance information and motion information about each of the body parts via a motion vector relative to a distance of the object;
 if there is the first object touched by the body of the user, determining a sensory effect corresponding to a texture of the first object based on the depth information and the texture information and outputting the sensory effect using ultrasonic acoustic radiation pressure; and
 else when none of the body parts touch the object, review another image data for the camera.

7. The method of claim 6, wherein determining the depth information and the texture information comprises:
 identifying the one or more objects included in the first image,
 calculating the information for the one or more objects, and detecting the texture information about the one or more objects.

8. The method of claim 6, wherein determining the motion of the body of the user comprises:
 generating the second image of the body of the user in real time image of the body of the user in real time; and
 determining another distance between the electronic device and the body of the user, and a body motion of the user using the second image.

9. The method of claim 8, wherein determining the other distance and the body motion of the user comprises:
 determining a second object corresponding to a body model included in the second image of the body of the user; and
 tracking movement of the second object.

10. The method of claim 6, wherein outputting the sensory effect using ultrasonic acoustic radiation pressure comprises outputting a different sensory effect corresponding to different textures of the first object.

* * * * *